April 29, 1941.　　　　G. F. WHITMAN　　　　2,240,360
ROTARY CUTTER
Filed Feb. 27, 1939　　　　2 Sheets-Sheet 1
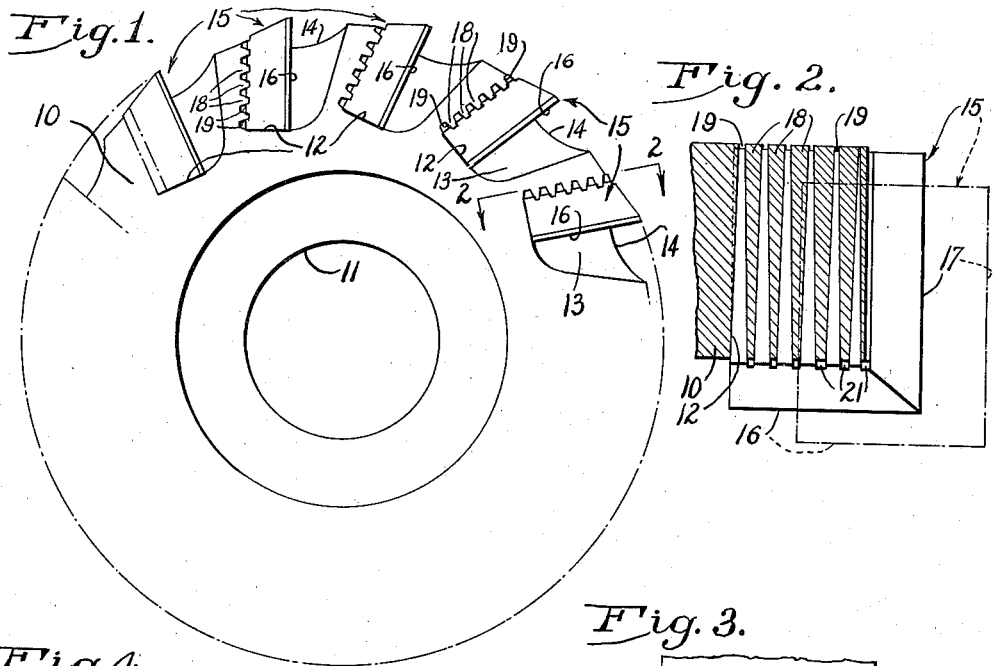
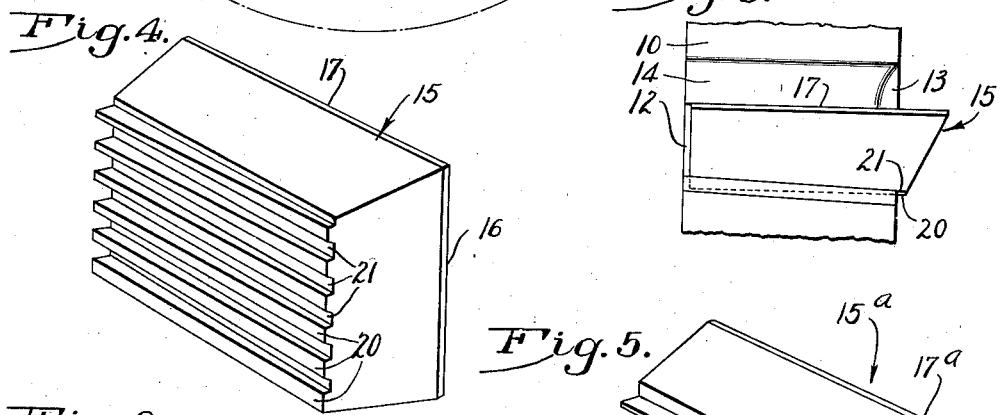
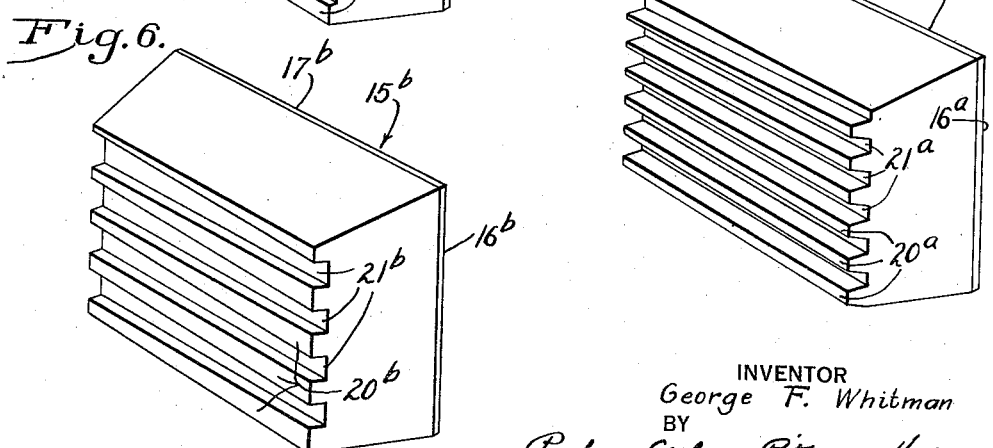
INVENTOR
George F. Whitman
BY
Parker, Carlson, Pitzner & Hubbard
ATTORNEYS April 29, 1941.　　　G. F. WHITMAN　　　2,240,360
ROTARY CUTTER
Filed Feb. 27, 1939　　　2 Sheets-Sheet 2
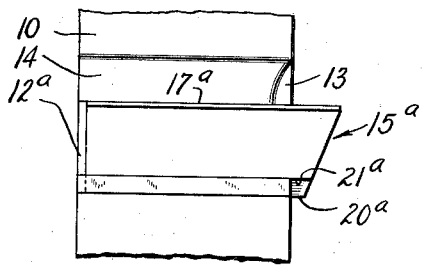
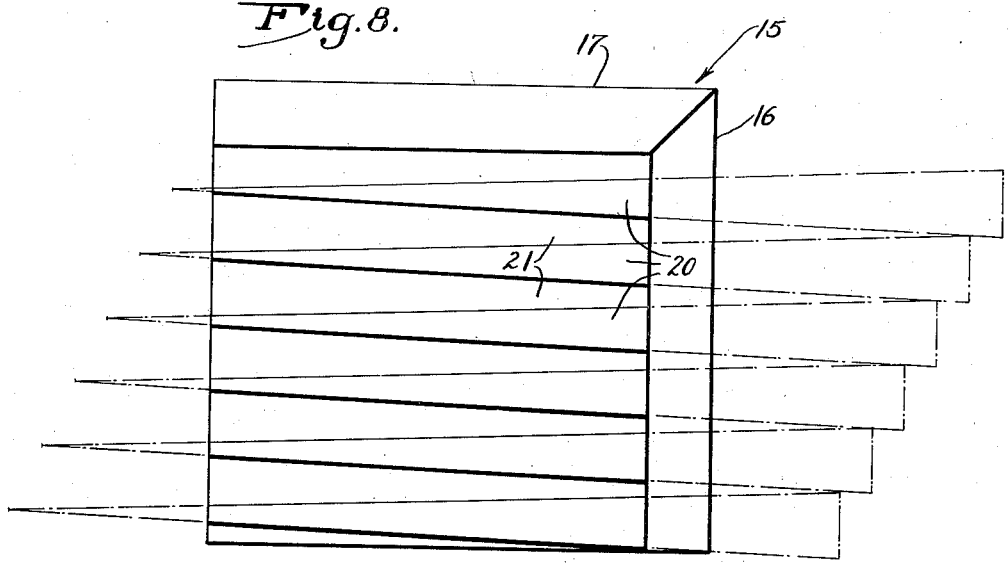
INVENTOR
George F. Whitman
BY
Parker, Carlson, Pitner & Hubbard
ATTORNEYS Patented Apr. 29, 1941

2,240,360

UNITED STATES PATENT OFFICE 2,240,360

ROTARY CUTTER

George F. Whitman, Rockford, Ill., assignor to Barber-Colman Company, Rockford, Ill., a corporation of Illinois Application February 27, 1939, Serial No. 258,644

11 Claims. (Cl. 29—105)

The invention relates generally to rotary cutters and more particularly to a cutter embodying an improved arrangement for adjusting the position of a cutting element of the cutter.

Various metal removing tools such, for example, as milling cutters and reamers, have heretofore been made in the form of what are commonly known as inserted blade cutters. In such cutters the cutting elements or blades are made of special hard cutting material while the cutter body may be of relatively softer, tough and less brittle material. As the blades become worn in use they must be reground and adjusted in position on the cutter body so that their new cutting edges are accurately located with respect to the axis of rotation of the blades. This adjustment operation is at times further complicated by the fact that two angularly disposed cutting edges are often fashioned on each of the blades and, consequently, the blades must be adjusted in two directions to position the respective cutting edges. Various expedients have heretofore been used to accomplish this so-called double adjustment. They have, however, usually entailed the use of wedges, shims, or other auxiliary parts such, for example, as the construction shown in my prior Patent No. 1,898,800, issued February 21, 1933.

One general object of the present invention is to provide a rotary cutter embodying a cutter body and an insertable cutter element or blade with the parts so arranged that plural direction adjustment of the cutting element on the cutter body may be accomplished easily and with accuracy without the use of auxiliary wedges, shims or other separate parts.

A further object of the invention is to provide a cutter of the character described in which an adjustment of the cutting element in one direction automatically results in its adjustment in another direction through a predetermined increment of distance.

A more specific object of the invention is to provide a cutter embodying a rotatable cutter body or holder part and a removable cutter blade part in which a simultaneous two-direction adjustment of the location of the blade part on the body part may be achieved by means of a series of wedge elements formed integrally and side by side on one of the parts with each such element longitudinally offset with respect to the next adjacent element and a complemental wedge element formed integrally on the other part and engageable selectively with any one of such series of wedge elements. With such an arrangement the complemental wedge element may be shifted laterally into engagement with any one of the series of wedge elements to shift the cutter blade a corresponding distance transversely of the series of wedge elements, while the progressive off-setting of the latter causes the part with the complemental wedge element on it to be automatically displaced a corresponding incremental distance longitudinally of the series of wedge elements.

The invention also resides in the novel form of blade structure utilized in the cutter herein disclosed.

Further objects and advantages of the invention will become apparent as the following description proceeds, taken in connection with the accompanying drawings in which:

Figure 1 is an end elevation of a cutter embodying the invention.

Fig. 2 is an enlarged detail sectional view along the line 2—2 of Fig. 1, illustrating the method of adjusting the cutter blades.

Fig. 3 is a fragmentary plan view of one of the blades and a portion of the cutter body in Fig. 1.

Fig. 4 is an enlarged perspective view of one of the cutter blades included in the device of Fig. 1.

Figs. 5 and 6 are enlarged perspective views of modified forms of cutter blades embodying the invention.

Fig. 7 is a fragmentary plan view, on a reduced scale, of the blades of either Figs. 5 or 6 in position in a cutter body.

Fig. 8 is an enlarged side elevation of one of the cutter elements showing in dot-dash lines the relative location of the projected sides of the wedge elements on it.

For purposes of illustration, the invention has been shown herein (Fig. 1) as embodied in a face milling cutter although it will be understood that the invention is also applicable to a large variety of other forms of cutters, reamers and the like.

The particular cutter illustrated embodies a rotatable cutter body or holder 10 having a central aperture 11 in which a suitable arbor (not shown) may be inserted. Peripheral slots or recesses 12 are fashioned on the exterior surface of the cutter body 10 to receive cutting elements inserted therein. The body or holder 10 is shown herein as unitary in construction although, of course, separable parts such as wear plates or the like may be used, for example, in the slot walls if desired. These slots extend generally axially of the cutter body (Fig. 3) and open radially outward from it. Preferably, the slots are raked slightly in the direction of rotation of the cutter body (clockwise, as viewed in Fig. 1), the slots being shown as open at both ends. A clearance space for chips is formed by relieving the cutter body along the leading front and side edges of the slots as indicated at 13 and 14 respectively.

In each of the slots 12 is a cutting element, shown herein as blades 15, made of suitable wear resistant cutting material such as hardened steel. The blades 15 are of a generally rectangular or block-like form, the end and side faces thereof being ground or otherwise relieved to form angularly disposed end and side cutting edges 16 and 17, respectively, along the margins of the leading side face.

To hold the blades 15 in place and locate each of them in accurately determined position in its respective slot 12, a novel arrangement of wedge elements is used at one side of each blade and the abutting side wall of the slot in which the blade is inserted. In general, a series of wedge elements arranged side by side are formed on one part, with each of these wedge elements off-set longitudinally with respect to the next adjacent wedge element, the off-set being made in one direction of adjustment for the blade and with the wedge elements lying transverse to the second direction of adjustment for the blade. One or more complemental wedge elements are formed on the other part so that this complemental element or elements can be inserted in any one of the series of wedge elements on the first part. In this way the off-set of the wedge elements in the series causes the blade to be set out automatically predetermined increments of distance corresponding to the displacement of the blade transversely to the series of wedge elements.

In the embodiment shown in Figs. 1 to 4, inclusive, a series of wedge elements is formed on the trailing side face of each slot 12 by a series of serrations in the form of lands 18 defining grooves 19. These lands or ribs 18 are tapered longitudinally toward the front edge of the slot (Fig. 2) so that the lands and grooves form tapered wedge elements. On the blade 15 a complemental series of wedge elements is formed by longitudinally tapering lands or ribs 20 defining grooves 21 therebetween. It will be noted that these wedge elements are tapered complementally or, in other words, in the opposite direction from the wedge elements on the side wall of the slot 12. Furthermore, the wedge elements, both on the blade 15 and on the slot wall, are off-set longitudinally with respect to each other. Thus, upon reference to Fig. 3, it will be seen that if the sides of the lands 20 are projected, as shown in dot-dash lines, that the tapered lands are in fact portions of triangles each of which is longitudinally offset an equal increment from the next adjacent one. In the case of the wedge elements on the blade 15, the lands 20 decrease in width progressively from the inner edge of the blade while the grooves 21 increase in width progressively. Similarly on the slot side wall the lands 18 increase in width progressively from the bottom of the slot outwardly, and the grooves 19 decrease in width progressively in the same direction. It should be particularly noted that in each set of serrations, that is, on both the blade and slot walls, the serrations are of uniform pitch in a plane extending transversely thereof. A series of wedge elements is preferably provided on both the cutter body and blade parts, rather than a series on one part and a single wedge element on the other, so as to achieve a maximum area of contact between these two parts irrespective of the position of the blade in the slot.

In fashioning the serrations or wedge elements on the blade shown in Fig. 4, the grooves 21 may be formed by a suitable milling cutter. The cut is started with full depth at the rear end of the blade and the blade is held tilted away from the path of cutter feed so that as the milling cutter moves along its path of feed the depth of cut is gradually decreased (Fig. 3). A milling cutter with tapered sides is used so that as the depth of the cut decreases its width also decreases. In this way the grooves 21 and ribs 20 are tapered longitudinally along both lateral sides. This construction is preferred since doubly or compound tapered wedging surfaces result. In other words, both the sides of the lands 20 and the bottoms of the grooves 21 are tapered longitudinally so that when one of the blades 15 is driven into its complemental slot 12 a very strong wedging action takes place.

When the blades 15 are new and hence of maximum size they are fitted into the slots 12 in the position shown in Fig. 2 and in which the bottom side of the blades fits snugly against the bottom wall of the corresponding slot 12. Then, after the blades have become worn and are ready for regrinding they are reinserted in the slots with, say, the bottom lands 20 on the blades inserted in the next to the bottom grooves 19 in the slot side walls, rather than in the bottom grooves as before so that the cutting edges 17 are displaced laterally outward to compensate for the decrease in width of the blade due to grinding. In this way the blades can be stepped out one serration at a time as they become worn. Due to the longitudinal off-set of the next to the bottom groove 19 with respect to the bottom groove on each blade, however, each of the blades 15 will also be displaced longitudinally outward a corresponding increment of distance so that the end cutting edges 16 are also moved out to compensate for the wear on the ends of the blades. The blades can, of course, be set out from time to time through successive steps and in each case both of the cutting edges 16 and 17 will be automatically moved out corresponding increments of distance. With the wedge elements arranged as shown with respect to the cutting edges 16 and 17, stepping out of the blades one or more serrations shifts them in a direction normal to, or at right angles to the side edge 17, while the resulting longitudinal displacement of the blades, due to the offset of the wedge elements, locates them automatically a corresponding increment of distance further out longitudinally in a direction normal to the end cutting edges 16.

Since the grooves 19 in the cutter body 10 taper toward the rear ends of the slots 12 (Fig. 2), it is apparent that pressure on the end cutting edges 16, during the operation of the cutter, will simply serve to drive the blades 15 more firmly into the slots. In other words, the pressure on the blades during working simply wedges them more tightly in place and has no tendency whatever to dislodge them.

In Fig. 5 a modified form of blade 15ª has been illustrated which also embodies the invention. This blade is generally similar in construction to blade 15 described above and is provided with end and side cutting edges 16ª and 17ª. Also, on the trailing face of the blade 15ª a series of longitudinally extending wedge elements are formed by lands or ribs 20ª defining grooves 21ª. In this case the grooves 21ᵃ are uniform in depth throughout so that the wedge elements have a single rather than a double longitudinal taper. It will be noted that the sides of the ribs 20ᵃ are sloped so that in cross section the ribs have a shape much like that of an Acme thread.

A complemental series of wedge elements is formed in the trailing side wall of the slots 12 in the cutter body (Fig. 7) to receive the blades 15ᵃ. In this case the slots 12ᵃ are of uniform width throughout rather than being tapered from their front ends as in the case of the slots for the blades 15 described above (Fig. 3).

The wedge elements formed by the ribs 20ᵃ and grooves 21ᵃ are offset longitudinally with respect to each other just as in the case of the wedge element 15, previously described. Accordingly, it will be apparent that the blade 15ᵃ can be stepped laterally to successive positions of engagement for the complemental wedge elements on it and on the slot side wall with the same automatic setting out of both cutting edges 16ᵃ and 17ᵃ.

Still another modified form of blade 15ᵇ, embodying the invention, is shown in Fig. 6. Again the blade is similar to the blade 15 and is provided with end and side cutting edges 16ᵇ and 17ᵇ. In this case, as before, the blade is located in position by a series of wedge elements on the blade and slot wall. In this instance, however, the wedge elements on the blade 15ᵇ are formed by a series of lands or ribs 20ᵇ defining grooves 21ᵇ and which are generally rectangular in cross section. As in the case of the ribs and grooves on the blade 15ᵃ, the grooves 21ᵇ are of uniform depth throughout their length. Each of the wedge elements is generally longitudinally offset with respect to the next adjacent wedge elements so that the ribs 20ᵇ decrease progressively in width from the inner side of the blade to the outer side while conversely the grooves 21ᵇ increase in width in the same direction. In all of the blades shown the serrations are of constant pitch, as measured in a plane transverse thereto.

The blade 15ᵇ can also be readily adjusted in position by simply stepping it out one serration at a time with the result that both cutting edges 16ᵇ and 17ᵇ are automatically set out corresponding increments of distance.

From the foregoing it will be apparent that a cutter has been provided in which the blades can quickly and accurately be adjusted to simultaneously reposition two angularly disposed cutting edges thereon. Furthermore, the locating and holding arrangement is made up entirely of parts formed integrally on the cutter elements or blades and on the cutter body so that no separate auxiliary wedges, shims or the like are required. Of course, if desired, the longitudinally offset wedge elements could be formed on a separate wedge element placed in the slot with the blade. The improved construction herein disclosed achieves not only a nicety of adjustment but also a strong rigid mounting for the blades with which they are held effectively against dislodgement during use.

Although certain embodiments of the invention have been shown and described in some detail for purposes of illustration, there is no intention to thereby limit the invention to such embodiments but on the other hand the appended claims are intended to cover all modifications and alternative constructions within the spirit and scope of the invention.

I claim as my invention:

1. A rotary cutter embodying a rotatable cutter body or holder part presenting an outwardly opening recess in its periphery, and a cutter element part inserted in said recess, said cutter being characterized by the provision of a series of wedge elements on one of said parts arranged side by side and with each such wedge element offset longitudinally with respect to the next adjacent wedge element, and a complemental wedge element on the other of said parts engageable selectively with any one of said first named series of wedge elements.

2. A cutter embodying a rotatable cutter body or holder part presenting an outwardly opening recess in its periphery, and a cutter element part inserted in said recess and provided with two angularly disposed cutting edges on the margins thereof, said cutter being characterized by the provision of a series of integral wedge elements on one of said parts arranged side by side and with each such wedge element offset longitudinally with respect to the next adjacent wedge element, and a complemental wedge element on the other of said parts engageable selectively with any one of said first named series of wedge elements, all of said elements extending generally away from one of said cutting edges and generally paralleling the other of said cutting edges.

3. A cutter embodying a rotatable cutter body or holder part presenting an outwardly opening recess in its periphery, and a cutter element part inserted in said recess, said cutter being characterized by the provision of a series of wedge elements on one of said parts arranged side by side and with each of such wedge elements offset longitudinally with respect to the next adjacent wedge element, and a complemental wedge element on the other of said parts engageable selectively with any one of the first named series of wedge elements, all of said wedge elements having a compound longitudinal taper.

4. A cutter comprising, in combination, a rotatable body having a slot in its periphery extending substantially longitudinally of the axis of rotation of the cutter body and with at least one open end at an end of said cutter body, a cutter element inserted in said slot and having two angularly disposed cutting edges on portions thereof projecting through the open side and end respectively of said slot, a series of wedge elements on one side wall of said slot extending generally axially of said body and tapering toward said end cutting edge, a complemental wedge element on the adjacent side of said cutter element engageable with any one of said series of wedge elements to step said cutter element out correspondingly radially of the cutter body, and each of said series of wedge elements being offset longitudinally with respect to the next adjacent wedge element, whereby such stepping out of the cutter element radially of the cutter body will also cause it to be relocated in corresponding increments of displacement axially of the cutter body.

5. A rotary cutter comprising, in combination, a rotatable cutter body having an outwardly opening recess in the periphery thereof extending generally axially of the body and with at least one open end, a cutter element inserted in said recess, and means for locating said element in said recess in plural positions of adjustment radially of said body with corresponding predetermined increments of displacement axially thereof, said last named means including a plurality of interfitting serrations on one side wall of said recess and on the abutting side wall of said element with the serrations extending in one of said directions of adjustment and tapered in such direction and differing from each other in width progressively in the other direction of adjustment.

6. A rotary cutter comprising, in combination, a rotatable cutter body having an outwardly opening recess in the periphery thereof extending generally axially of the body and with at least one open end, a cutter element inserted in said recess and having two angularly disposed cutting edges on portions thereof projecting respectively from the open side and end of said recess, and means for locating said element in said recess in plural positions of adjustment radially of said body with corresponding predetermined increments of displacement axially thereof, said last named means including a plurality of interfitting serrations on the trailing side wall of said recess and on the abutting side wall of said element with the serrations extending generally away from said end cutting edge and tapered in such direction and differing from each other in width progressively in a direction transverse thereto.

7. A rotary cutter comprising, in combination, a rotatable cutter body having an elongated outwardly opening slot in the periphery thereof extending generally axially of the body and with at least one open end, a generally rectangular block-shaped cutter blade inserted in said slot and having end and side cutting edges thereon respectively on one end and one side thereof which project from the open end and side of said slot, and means for locating and holding said blade in said slot in plural positions of adjustment radially of said body with corresponding predetermined increments of displacement axially thereof so as to set out both of said cutting edges simultaneously upon each relocation of the blade, said last named means including a plurality of longitudinal interfitting serrations on one side wall of said slot and on the abutting side wall of said blade, said serrations having a compound longitudinal taper and in a direction to be wedged together by pressure applied longitudinally of the blade at said end cutting edge, and each of said serrations constituting a portion of a wedge which is triangular in side elevation and with each one longitudinally offset by equal increments from the next adjacent ones.

8. A rotary cutter comprising, in combination, a rotatable cutter body having an outwardly opening recess in the periphery thereof extending generally axially of the body and with at least one open end, a generally block shaped cutter blade inserted in said recess and having end and side cutting edges thereon projecting respectively beyond the open end and side of said slot, and means for locating said blade in said slot in plural positions of adjustment radially of said body with corresponding predetermined increments of displacement axially thereof, said last named means including a plurality of interfitting serrations arranged in two sets with one set on one side wall of said recess and the other set on the abutting side wall of said blade and with all of the serrations extending generally parallel to said side cutting edge and generally normal to said end cutting edge, said serrations in each of said sets thereof differing in width from each other progressively in a direction transverse thereto and the serrations in each set being of uniform pitch as measured in a transverse plane.

9. For use in a rotary cutter of the type described, an insertable blade fashioned in generally block-like form with marginal end and side cutting edges, and having a plurality of serrations on one side face thereof extending generally parallel to said side cutting edge and generally normal to said end cutting edge, said serrations decreasing progressively in width from the base of the blade to the side having the side cutting edge thereon, and said serrations being of uniform pitch as measured in a plane transverse thereto.

10. For use in a rotary cutter of the type described, an insertable blade fashioned in the form of a generally rectangular block of cutting material with cutting edges along one side and end margins thereof, and having integral longitudinally tapered serrations on one side face thereof differing from each other in width progressively from one side edge of the block to the other.

11. For use in a rotary cutter of the type described, an insertable blade fashioned in generally block-like form of cutting material with a marginal cutting edge thereon, and having a series of integral longitudinally tapered wedge elements on one side face thereof each longitudinally offset with respect to the next adjacent element.

GEORGE F. WHITMAN.